United States Patent [19]
Wilder

[11] Patent Number: 5,408,417
[45] Date of Patent: Apr. 18, 1995

[54] AUTOMATED TICKET SALES AND DISPENSING SYSTEM

[76] Inventor: Wilford B. Wilder, P.O. Box 66730, Houston, Tex. 77006-6730

[21] Appl. No.: 271,213

[22] Filed: Jul. 5, 1994

Related U.S. Application Data

[63] Continuation of Ser. No. 889,645, May 28, 1992, abandoned.

[51] Int. Cl.⁶ .............................................. G06F 15/26
[52] U.S. Cl. .................................. 364/479; 364/401; 364/407; 235/381
[58] Field of Search ............... 364/478, 479, 401, 407, 364/DIG. 1, DIG. 2, 521; 235/381, 384; 360/12

[56] References Cited

U.S. PATENT DOCUMENTS

| | | | |
|---|---|---|---|
| 4,359,631 | 11/1982 | Lockwood et al. | 235/381 |
| 5,119,295 | 6/1992 | Kapur | 364/412 |
| 5,239,480 | 8/1993 | Huegel | 364/479 |

*Primary Examiner*—Paul P. Gordon
*Assistant Examiner*—Cameron H. Tousi
*Attorney, Agent, or Firm*—Kenneth A. Roddy

[57] ABSTRACT

An automated ticket sales and dispensing system is customer operated to provide tickets for various entertainment events, travel, and other products and services such as lottery tickets, gift certificates, raffle tickets, moneygrams, and in some areas, off-track betting without the aid of an employee. The system includes a terminal which has a monitor with an interactive touch-sensitive display screen which will show the customer a view of the stage or field as seen from the seating area of the seats which have been selected prior to the purchase with the ability to accept or select another seat. The system is menu driven and allows a customer to select and purchase tickets by touching the screen in response to messages displayed on the screen. Verbal messages in one or more languages may be given along with visual messages. The system will accept payment in the form of cash, credit cards, bank debit cards, and local personal checks. A video cassette player in the terminal continuously shows upcoming events and attractions in the area and advertising for local clubs and restaurants during periods when no transactions are being made. The terminal may be placed at various convenient locations and is operational around the clock for the convenience of ticket purchasers.

17 Claims, 7 Drawing Sheets

AUTOMATED TICKET SALES AND DISPENSING SYSTEM

CROSS REFERENCE TO RELATED APPLICATION

This is a continuation of Application Ser. No. 07/889,645, filed May 28, 1992 now abandoned as of Jul. 5, 1994.

BACKGROUND OF THE INVENTION

1. Field of the Invention

This invention relates generally to ticket sales and vending machines, and more particularly to a customer operated ticket sales and vending system which will accept legal tender, credit media, and negotiable instruments for various events and purchases, and produces a visual display relative to the respective purchase during the transaction.

2. Brief Description of the Prior Art

In the past, the public had to purchase their tickets at central locations that were operated by employees. The employee was required to help the customer choose an event, venue, and seat, then had to handle the monetary transactions for the tickets. These ticketing centers are often located in stores that are not related to the ticket service and they are manned by store personnel that do not get paid extra for selling tickets. Customers frequently receive poor service from an employee who really has no desire to sell tickets.

Most manned ticket centers only sell tickets to musical, theatrical, and sporting events and usually will accept only cash and credit cards for purchases. Thus, when a customer purchases a ticket he has to travel far, pay more money, and has inferior service provided to him in actual seat selection.

There are several patents which disclose various ticket vending systems and apparatus.

Wahlberg, U.S. Pat. No. 3,705,384 discloses a multiple transaction business machine which selects a plurality of transactions, totals the cost of the transactions, and determines the value of payment. The machine receives and validates legal tender, credit media, and negotiable instruments, validates the identity of the purchaser, and vends tickets. The system has a remote data link for credit verification and purchaser identification.

Trippe et al, U.S. Pat. No. 4,788,643 discloses a travel information and booking data processing system wherein airline reservation computers are connected to remotely located data processing terminals in travel agents' offices and also to a separate computer having a database containing detailed information on available cruises offered by subscribing cruise line operators.

Davies et al, U.S. Pat. No. 4,818,854 discloses an automatic ticket handling machine adapted for use as a ticket vending station which has a display screen, a telephone receiver-speaker unit, and a credit card reader unit. A sheet handling mechanism within the machine receives processed tickets from a printer in a holding bin which can either dump them or be shifted to present them to a user automatically when the user opens an access door on the machine.

Dainekoff et al, U.S. Pat. No. 4,931,932 discloses an electronic clearing system used for wait-listed customer airline reservations which has one or more information storage devices from which transactions can be generated, at least one forwarding and storage station for requesting a desired transaction, and an information processing unit for evaluating requested items with respect to the stored information. The information processing unit compiles a list of uncompleted transactions and queries the information storage devices for the availability of items to fill each transaction on the list.

Hirahara, U.S. Pat. No. 4,984,170 discloses an automatic ticket vending machine having a memory for storing a first fair or fee and second fair or fee, a calendar means for storing days and times, clock means for measuring day and time, and ticket issuing means for issuing tickets at the first fair or fee on a specific day and time and at a second fair or fee on a different day and time.

The present invention is distinguished over the prior art in general, and these patents in particular by an automated ticket sales and dispensing system which is customer operated to provide tickets for various entertainment events, travel, and other products and services such as lottery tickets, gift certificates, raffle tickets, moneygrams, and in some areas, off-track betting without the aid of an employee. The system includes a terminal which has a monitor with an interactive touch-sensitive display screen which will show the customer a view of the stage or field as seen from the seating area of the seats which have been selected prior to the purchase with the ability to accept or select another seat. The system is menu driven and allows a customer to select and purchase tickets by touching the screen in response to messages displayed on the screen. Verbal messages in one or more languages may be given along with visual messages. The system will accept payment in the form of cash, credit cards, bank debit cards, and local personal checks. A video cassette player in the terminal continuously shows upcoming events and attractions in the area and advertising for local clubs and restaurants during periods when no transactions are being made. The terminal may be placed at various convenient locations and is operational around the clock for the convenience of ticket purchasers.

SUMMARY OF THE INVENTION

It is therefore an object of the present invention to provide an automated ticket service that provides tickets not only for all entertainment events, but also for travel and other products and services such as lottery tickets, gift certificates, raffle tickets, moneygrams, and in some areas, off-track betting.

It is another object of this invention is to provide an automated ticket sales and dispensing machine having a video display screen which will show the customer an actual view of the stage or field as seen from the seats which have been selected prior to the purchase.

Another object of this invention is to provide an automated ticket sales and dispensing machine having an interactive video display which will show the customer a view of the stage or field as seen from the seating area of the seats which have been selected with the ability to accept or select another seat, thereby insuring maximum customer satisfaction.

Another object of this invention is to provide an automated ticket sales and dispensing machine which is menu driven and allows a customer to select and purchase tickets without the aid of an employee.

Another object of this invention is to provide an automated ticket sales and dispensing machine which is menu driven and has a monitor with a touch sensitive display screen which allows a customer to select and purchase tickets by simply touching the screen in response to messages displayed on the screen.

Another object of this invention is to provide an automated ticket sales and dispensing machine which may be placed at various convenient locations and is operational around the clock for the convenience of ticket purchasers.

Another object of this invention is to provide an automated ticket sales and dispensing machine having a video display and a video player which will continuously show upcoming events and attractions in the area and advertising for local clubs and restaurants during periods when no transactions are being made.

A further object of this invention to provide an automated ticket sales and dispensing machine which has the capability to accept not only cash and credit cards, but also checks and bank debit cards.

A still further object of this invention is to provide an automated ticket sales and dispensing machine which is simple in construction, economical to manufacture, and reliable in operation.

Other objects of the invention will become apparent from time to time throughout the specification and claims as hereinafter related.

These and other objects are accomplished by the present automated ticket sales and dispensing system which is customer operated to provide tickets for various entertainment events, travel, and other products and services such as lottery tickets, gift certificates, raffle tickets, moneygrams, and in some areas, off-track betting without the aid of an employee. The system includes a terminal which has a monitor with an interactive touch-sensitive display screen which will show the customer a view of the stage or field as seen from the seating area of the seats which have been selected prior to the purchase with the ability to accept or select another seat. The system is menu driven and allows a customer to select and purchase tickets by touching the screen in response to messages displayed on the screen. Verbal messages in one or more languages may be given along with visual messages. The system will accept payment in the form of cash, credit cards, bank debit cards, and local personal checks. A video cassette player in the terminal continuously shows upcoming events and attractions in the area and advertising for local clubs and restaurants during periods when no transactions are being made. The terminal may be placed at various convenient locations and is operational around the clock for the convenience of ticket purchasers.

DESCRIPTION OF THE PREFERRED EMBODIMENT

For ease of understanding, a brief overview of the system will be described followed by a more detailed description. The control system for the ticket sales and vending machine is a microcomputer having a central processing unit microprocessor with RAM and ROM memories which is operated by the input of the consumer in response to several menus displayed on the video display screen. The video display screen is touch sensitive such that the consumer has only to touch the screen at the appropriate area to input information. The microprocessor is connected by modem to a central information center for periodically sending and receiving data and updating information stored on a resident hard disk. The microprocessor is operatively connected with a VHS video playback unit to display various action video and graphics. A currency handling system and a ticket vending system are also controlled by the microprocessor. An interesting feature of the present system is that a consumer may be presented with a view the stage or field from the seat for which a ticket has been selected prior to the ticket purchase.

Figure 1:
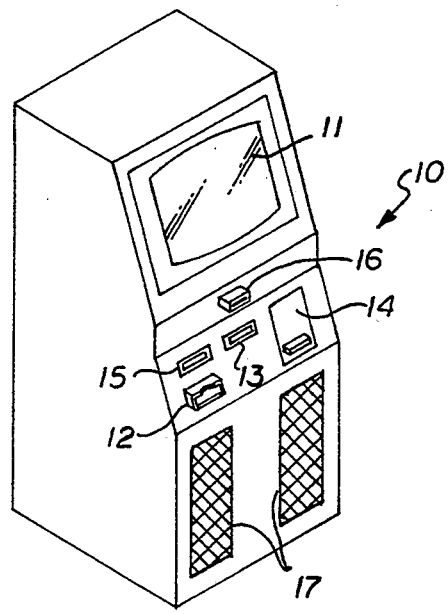
FIG. 1 an isometric view of the exterior of the console for the ticket sales and dispensing system in accordance with the present invention.

Referring now to the drawings by numerals of reference, there is shown in FIG. 1, a ticket vending console or terminal 10 which contains the components of the ticket sales and dispensing apparatus. A color, touch-sensitive video display screen 11, a bill insertion slot 12 for accepting currency, check accepting slot 13 for accepting checks, a currency drop-slot 14 for dispensing currency change, a credit card insertion slot 15, a ticket issuance slot 16, and a speaker system 17 are visible from the exterior of the console housing.

Figure 2:
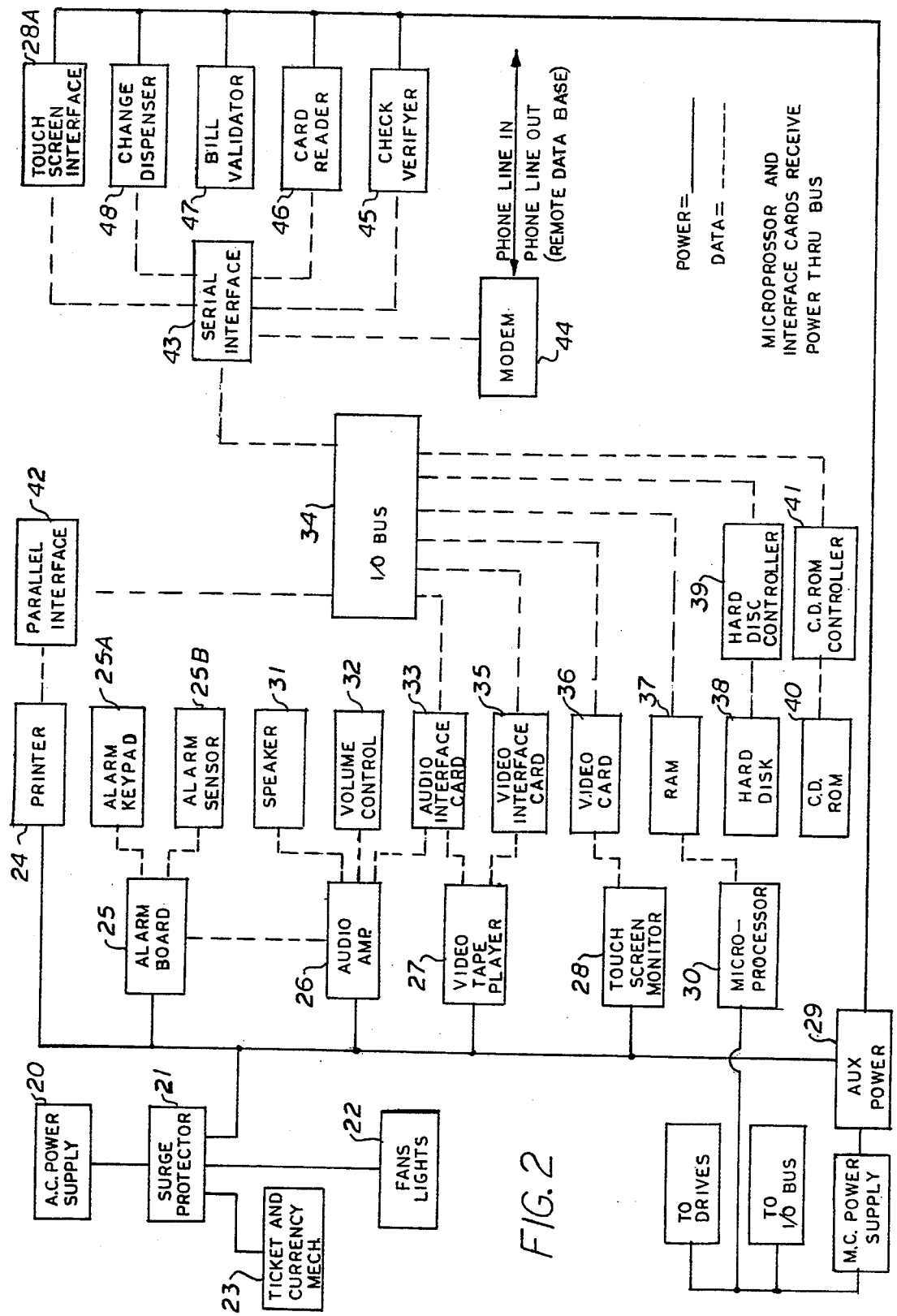
FIG. 2 is a block diagram illustrating the relationship of the major components of the system.

FIG. 2 illustrates in block diagram, the relationship of the main components of the ticket sales and dispensing system. The electrical leads are represented by solid line and the data communication lines are represented by dotted line. The system is powered by an AC power supply 20 and the current is filtered through a surge suppression device 21 to prevent damage to the components due to electrical surges. The AC power supply 20 is connected through the surge suppressor 21 to the console electric cooling fans and lights 22, the ticket and currency handling mechanisms 23, a ticket printer 24, an alarm board 25, a sound amplifier 26, a VHS video cassette playback unit 27, and a touch sensitive video display monitor 28. An auxiliary backup power supply 29 is connected to the main power supply 20 through the surge suppressor 21 and to the microcomputer microprocessor 30 such that in the event of a power outage, the back-up power supply will provide current for an orderly shutdown sequence of the system.

The alarm board 25 in the console is connected to an alarm keypad 25A for inputting a security code and is connected to one or more sensors 25B at strategic locations on the console for sensing motion or unauthorized opening of the doors. The alarm board 25 is connected to the audio amplifier 26 which is connected to a loudspeaker 31 for sounding an audible alarm upon detection of motion by the sensors 25B. The audio amplifier 26 is provided with a volume control 32. An audio interface card 33 connected with the microcomputer I/O bus 34 of the microcomputer 30 (described hereinafter) is connected with the audio amplifier 26 and allows verbal messages in one or more languages in a digitally synthesized voice to be given along with visualy displayed messages. A video interface card 35 connected with the microcomputer I/O bus 34 is connected with VHS video cassette playback unit 27. A VGA video controller card 36 connected with the microcomputer I/O bus 34 is connected with the touch sensitive video display interface 28A. The microcomputer 30 includes a central processing unit (CPU) 37 and RAM memory connected to the I/O bus 34 and to the touch sensitive video display monitor 28.

The microcomputer has one or more hard disk storage units 38 controlled by hard disk controllers 39. The system may utilize magnetic or magno-optic data storage having very high memory storage capacity such as CD ROM 40 controlled by CD ROM controller 41. The audio interface card 33, video interface card 35, VGA video controller card 36, and CPU of 37 of the microcomputer 30 are connected to the main I/O bus 34 for transferring data and electrical signals. The I/O bus 34 has a parallel I/O interface port 42 into which the printer 24 is connected, and a plurality of serial I/O interface ports 43.

A modem 44 is connected to the serial port 43 and to a telephone line for data communication between the microcomputer and a remote location. The touch sensitive video display screen 28 is connected to the serial port 43. A check verifier 45, a credit card reader 46, a bill validator 47, and a change dispenser 48 are connected to the microcomputer 30 via the serial I/O port 40.

The basic arithmatic, logic, and control required for processing are carried out by the microprocessor central processing unit CPU 37 which controls the operation of the system. Random access memory (RAM) 50 temporarily stores data in the course of computation and controls the operation of the microprocessor CPU. The microprocessor I/O circuit is adapted to input and output various data and control signals to the peripherals through the parallel and serial ports 38 and 40. The I/O circuit is also adapted to output various audio signals to the loudspeaker 31 through the amplifier circuit 26.

The display circuit displays video signals generated through the microprocessor CPU 37, VHS video cassette playback unit 27, and touch sensitive screen interface 28A of the monitor 28. The touch-sensitive video display monitor 28 and interface 28A is conventional in the art and is preferably of the infrared type having opposed radiation source/detector means arrayed about the display screen. The system is menu driven by displaying a series of windows or images on the screen which when touched or pressed in designated areas by the finger of the user, will generate input data signals in response to messages displayed by the computer program. Data verification is accomplished via the modem 44 during certain transactions and the modem allows resident memory to be updated from time-to-time.

In the preferred embodiment, recorded transactions are downloaded to a central data base, and event data and ticket availability data is uploaded once on an hourly basis. Tickets to events are available for purchase up to thirty-minutes before show time.

Figure 3:
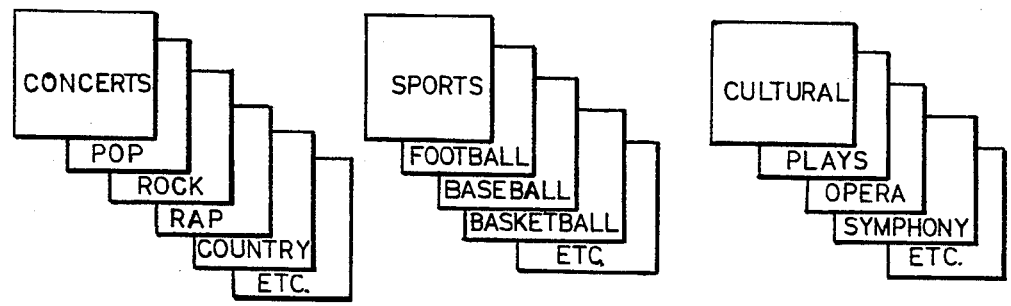
FIG. 3 is a diagram illustrating the arrangement of memory storage of the system.
Figure 3:
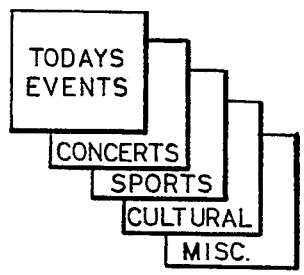
Figure 3:
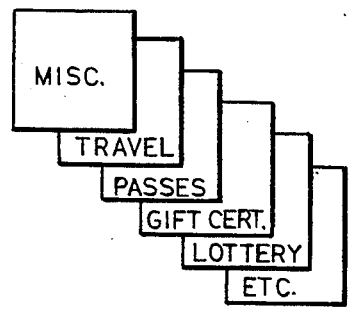
Figure 3:
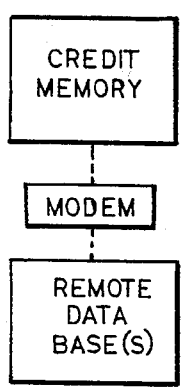

As illustrated diagrammatically in FIG. 3, data storage is divided into various ticket or event main categories, such as: concerts, sports, cultural, todays events, and miscellaneous. The main categories are divided into sub-categories. For example, concert sub-categories would include, pop, rock, rap, country, alternative, and miscellaneous. For the sports, sub-categories would be football, baseball, basketball, and miscellaneous. For the cultural, sub-categories would be opera, ballet, plays, symphonies, art exhibits, and miscellaneous. The main category of miscellaneous would include such things as: pre-paid ticket pick-up, gift certificates, lottery tickets, raffle tickets, moneygrams, travel tickets, bus passes, and tickets to out-of-town events. Todays events would be all the events from the various sub-categories which occur on the date of the log-in determined by a calendar clock-timer in the central processing unit.

Each of the specific events is further classified in memory into reserved seating or general admission and the number of tickets available. The stored data is updated via modem from time-to-time (once each hour) from one or more remote main data banks. Specific events are correlated with venues where the events take place and the venues have a corresponding graphic image stored in memory of an overall seat map of the venue.

Certain ones of the events may have stored, a view of the stage or playing field which corresponds to the view as seen from the location of a seating area of a particular seat. This is accomplished by storing views of all venues as seen from each seating area on a CD ROM disc and indexing the appropriate picture with the seat area location in the venue.

The microcomputer has programs stored locally to carry out payment computations and transactions and will conduct operations to handle cash, credit card, bank debit (ATM) cards, and local personal checks. The microcomputer is operatively connected to a bill acceptor/verifier unit which will determine denominations and verify that the bill is not counterfeit, a currency dispenser for making change, a manual swipe credit card reader to decode information on credit cards, and a personal check reader which reads the magnetic code on the bottom of checks. A customer may establish an account with the ticket vending service for writing personal checks wherein the customer would establish a credit limit with a credit card number to be used to guarantee check writing transactions. The customer would be issued a four digit check approval number. A credit database stores information pertaining to check approval numbers and bad credit for particular credit card numbers and is updated periodically via modem from a remote credit service data bank via modem. In the event of a desired transaction going over a predetermined dollar limit for credit cards, the terminal will dial out to a credit data bank via modem for approval.

The microcomputer is operatively connected to a ticket printing and dispensing mechanism and has programs stored in local memory to carry out ticket printing operations and operation of the ticket dispensing mechanism. The ticket stock is stored in steel box in the console and the individual tickets are printed out after the purchase has approved.

Figure 4:
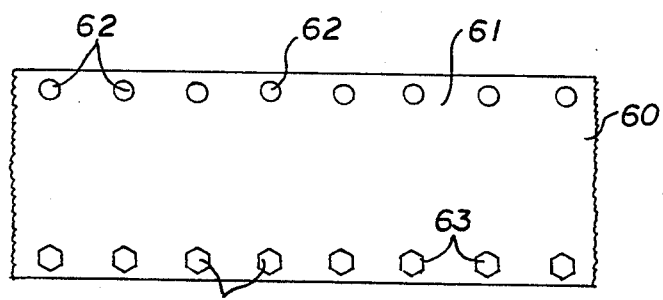
FIG. 4 and 5 front and rear views, respectively, of a ticket dispensed by the system of the present invention.
Figure 5:
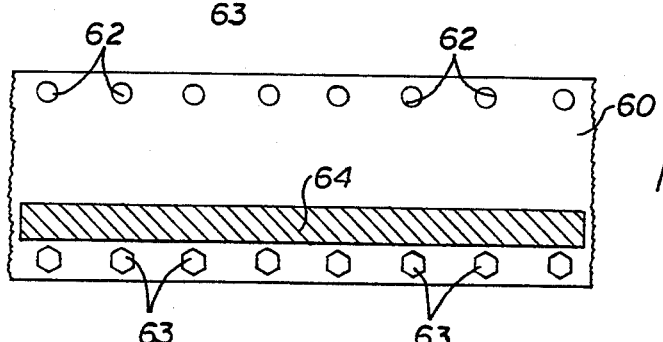

FIGS. 4 and 5 are front and rear views, respectively, of a ticket 60 dispensed by the system of the present invention. Preferrably, the ticket stock is substantially counterfeit-proof. The ticket stock may have a unique color combination, raised printing for the company logo 61, a series of holes 62 at the top for the tractor feed wheel of the printer. The ticket stock may also have a portion at the bottom which will have different shapes 63 punched out by an additional printer drive wheel that is changed on a regular basis. The back of the ticket may be provided with a strip of holographic film 64 which makes it more difficult to counterfeit.

Figure 6:
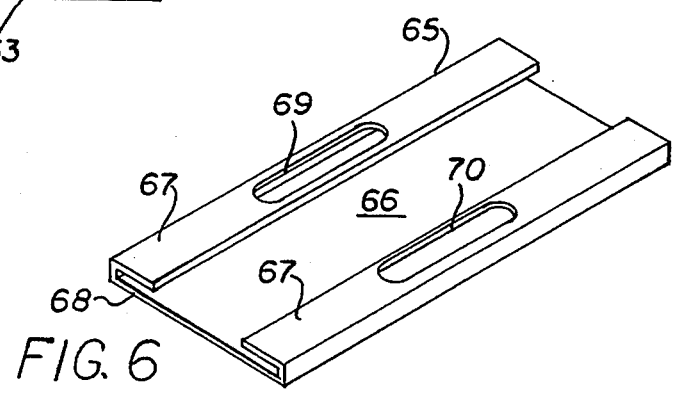
FIG. 6 is an isometric view of a ticket feed chute used in the ticket dispensing system of the present invention.

FIG. 6 shows a ticket feed chute 65 used in the ticket dispensing system of the present invention. The ticket chute 65 is a thin rectangular member having a base portion 66 and a pair of inwardly facing lips or flanges 67 along the longitudinal sides which define a thin slot 68 through which the ticket stock is fed. The upper surfaces of the flanges 67 have apertures 69 therethrough to receive the tractor feed wheel and the additional printer wheel which punches out shapes in the ticket stock. The ticket stock passes through the chute 65 as it comes out of the steel box in which it is stored and is fed to the printer. After printing, the tickets are fed to the ticket dispensing slot 15 on the console where they are retained until removed by the customer.

OPERATION

Figure 7:
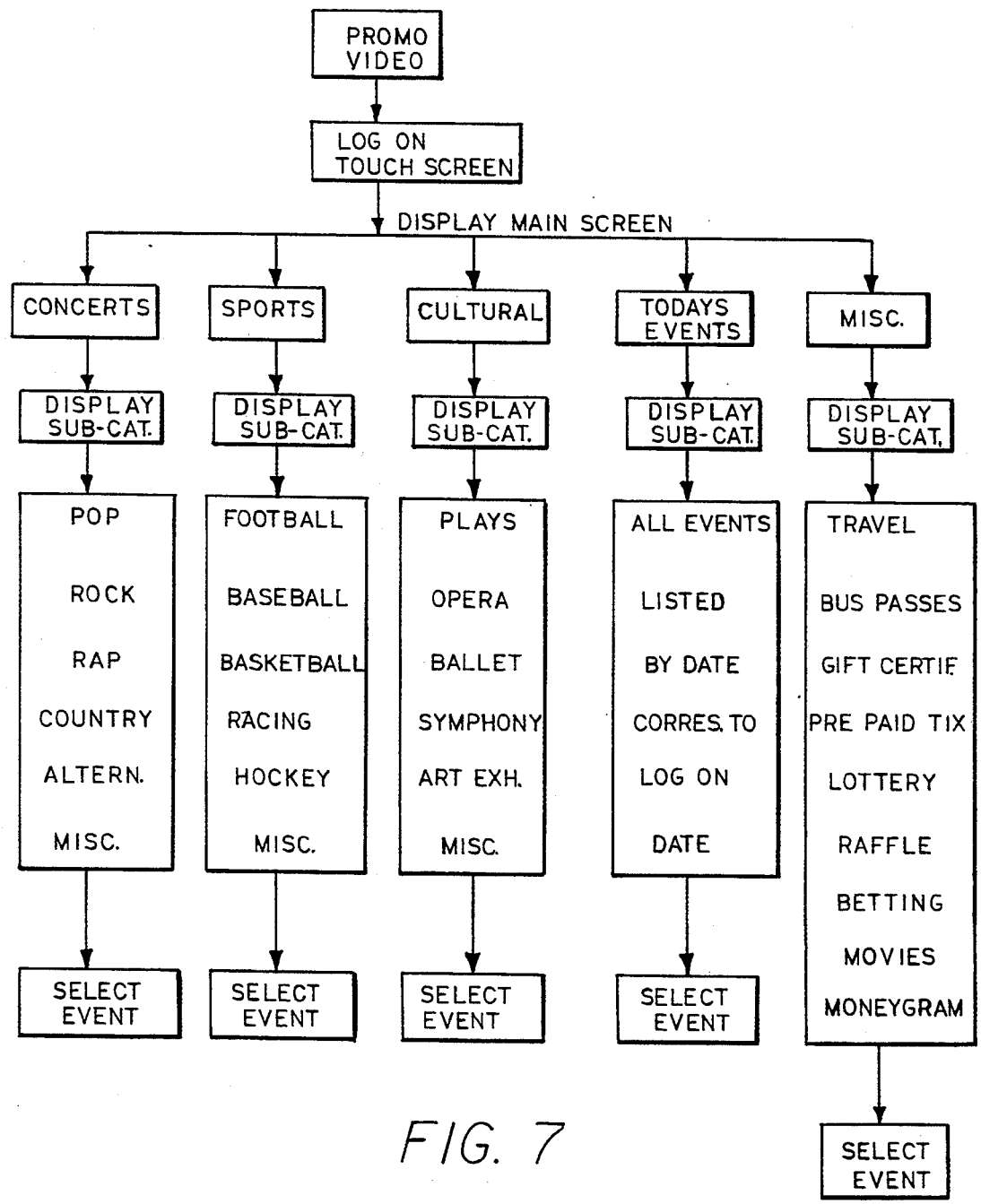
FIG. 7 is a block diagram illustrating the select event program during operation of the system.

Referring now to FIG. 7, the terminal console stands ready to handle transactions twenty-four hours a day. During times when no transactions are being made, the microprocessor runs a promotional program that operates the VHS video cassette playback unit which is loaded with a cassette tape displaying upcoming events and attractions in the area and advertising for local clubs and restaurants in the form of action video and/or graphics. The image of a "start" button or symbol is also displayed on the screen. The video tape rewinds and replays automatically, running continuously until a customer touches the "start" button displayed on the touch sensitive screen of the video display monitor along with a moving marquee-type text message. When a person touches the "start" button or symbol displayed on the monitor, the signal is received by the microprocessor and a program in local memory closes the video display window and initiates an event selection program bringing up the main menu.

MAIN CATEGORIES

The event selection program displays the main category menu on the touch sensitive screen which is a series of blocks containing the titles of the main categories of events for which tickets may be purchased. For example; CONCERTS, SPORTS, CULTURAL, TODAYS EVENTS, MISCELLANEOUS, and EXIT. A window above the blocks displays scrolling text intructing the user on the use of the system. Another window displays the time remaining for the transaction. The time remaining window appears on all subsequent displays.

The customer then chooses the desired main category and touches the screen at the block of his or her selection. This signal is inputted to the microprocessor and the program retrieves from hard disk storage a list of all the sub-categories for the selected main category and displays them in another series of blocks on the screen. For example; if CONCERT were selected as the main category, the sub-categories displayed would include, POP, ROCK, RAP, COUNTRY, ALTERNATIVE, and MISCELLANEOUS.

The customer then chooses the desired sub-category and touches the screen at the block of his or her selection. This signal is inputted to the microprocessor and the program searches hard disk storage to retreive all specific events listed in the selected sub-category. The specific events are listed on the screen in chronological order with the name, date, time of performance, and price of tickets. Also displayed on the screen is a highlighted area at the center and an up and down arrow or direction symbol. The list of specific events can be scrolled up and down by the user touching the arrow or direction symbol. The specific event is selected by the user placing the desired event in the highlighted area and the touching the highlighted area of the screen. This signal is inputted to the microprocessor and the program searches hard disk storage to determine if the selected specific event is reserved seating or general admission.

If the main category of TODAYS EVENTS is selected, the signal is inputted to the microprocessor and the program retrieves from hard disk storage a list of all the events in all sub-categories corresponding to the date of the log on. These events are listed on the screen with the name, date, time of performance, and price of tickets. Also displayed on the screen is a highlighted area at the center and an up and down arrow or direction symbol. The list of events can be scrolled up and down by the user and the desired event is selected by the user placing the desired event in the highlighted area and the touching the highlighted area of the screen. This signal is inputted to the microprocessor and the program searches hard disk storage to determine if the selected event is reserved seating or general admission.

GENERAL ADMISSION

Figure 8:
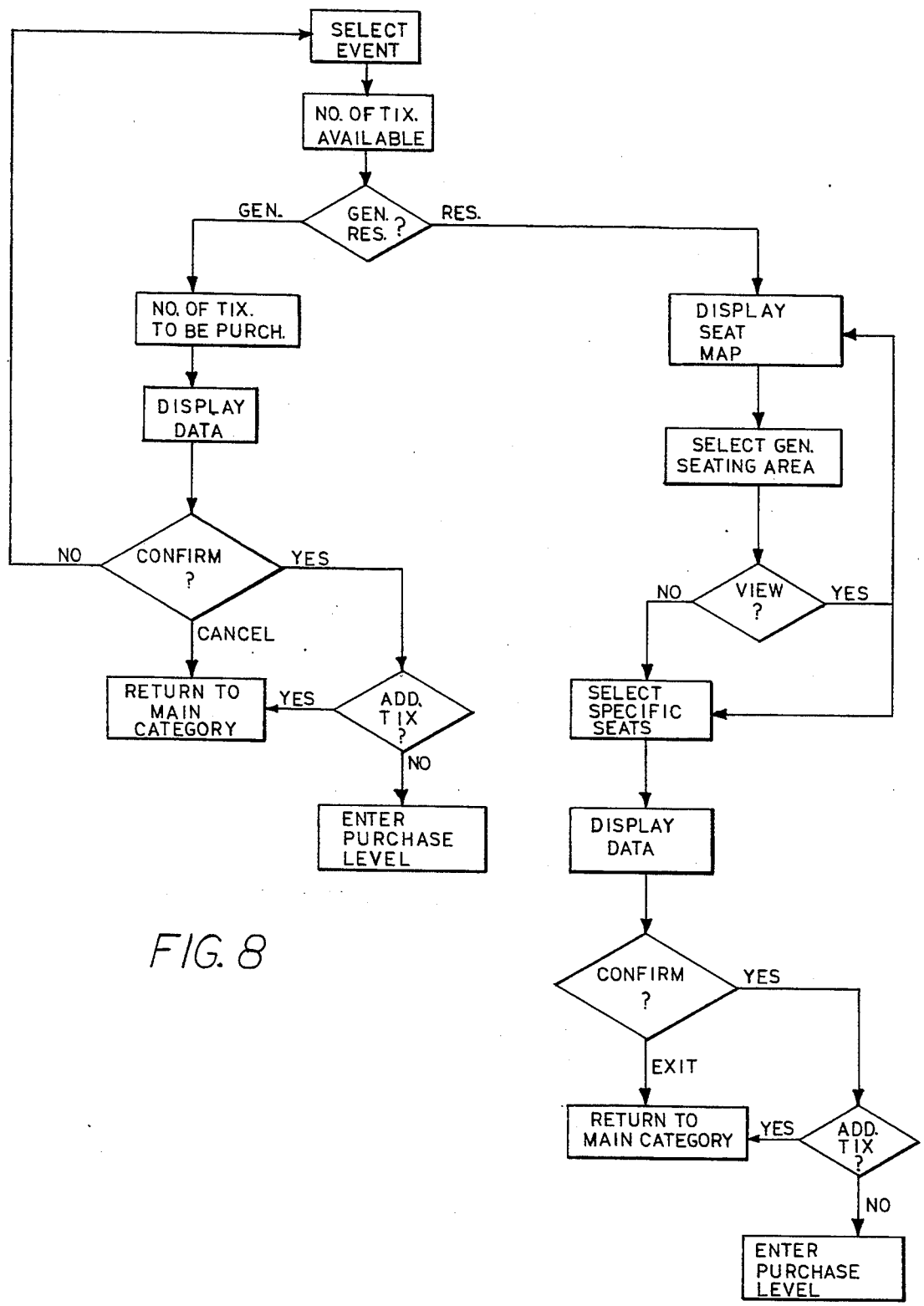
FIG. 8 is a block diagram illustrating the operation the select event program during general admission and reserved seating transactions.

As illustrated in FIG. 8, if the selected event is general admission, the program checks resident hard disk storage to determine the number of tickets available for the selected event. The microprocessor displays a window showing the total number of tickets available at the particular terminal for the selected event, a window showing the remaining tickets available for the transaction, and a window showing the number of tickets to be purchased for the selected event. A pair of blocks are displayed below the windows; one for increasing the number of tickets to be purchased, and the other for decreasing the number of tickets to be purchased. Also displayed are a series of blocks; one labeled PROCEED, one labeled EXIT, and another labeled HELP. Touching the EXIT block aborts the selection process and the program returns to the main category display. Touching the HELP block displays text instructing the user on use of the system. Instructions may also be given audibly by a synthesized voice through the sound system.

The customer then selects the number of tickets desired by touching the increase and decrease blocks. A maximum of ten seats is recommended to prevent "ticket scalping". After selecting the desired number of tickets, the customer touches the PROCEED block which causes the program to display a confirmation screen that displays the data inputted and stored in temporary memory, which is the event, date, time of performance, number of tickets, price per ticket, and total purchase price. This data is displayed on the screen along with an up and down direction symbol or block, an UNSELECT block, a RESELECT block, a CANCEL block, and a PROCEED block.

The customer can unselect or reselect the tickets by touching the appropriate block which returns the program to the previous event selection screen. Touching the CANCEL block aborts the selection process and the program returns to the main category display. Touching the PROCEED block causes the program to enter the purchase level described hereinafter.

RESERVED SEATING

If the selected event is reserved seating, the program retrieves from hard disk storage and displays a map of the seating areas in the venue where the event is to take place along with a PROCEED block, an EXIT block, a HELP block, and a window displaying text instructing the customer to select the general seating area in the venue he or she would like to sit by touching the screen. Touching the EXIT block aborts the selection process and the program returns to the main category display. Touching the HELP block displays text instructing the user on use of the system. Instructions may also be given audibly by a synthesized voice through the sound system.

The customer then chooses the general seating area and touches the screen at the desired area of the displayed seat area map and touches the PROCEED block. This signal is inputted as a command for an enlargement and the microprocessor then displays an enlarged view of the selected area with only the seats for which tickets are available shown. Also displayed on the screen are UP, DOWN, RIGHT, and LEFT arrows or positioning symbols along with SELECT, UNSELECT, PROCEED, EXIT, HELP, and VIEW blocks or symbols and a message instructing the customer to select the exact seats desired in that area. A maximum of ten seats is recommended to prevent "ticket scalping".

By touching the appropriate positioning symbol, the user can move a pair of cross-hair cursers to intersect on the exact seat desired and the selection is entered by touching the SELECT block. Selected seats do not have to be adjacent one another, nor consecutively numbered.

Alternatively, the system may allow the customer to select the exact seats desired by touching the screen at the position of each desired seat, rather than using the cross-hair curser. Each selected seat is highlighted after being entered.

At any time during the seat selection process, the customer can touch the VIEW block to see the actual view of the stage or field as would be seen from the selected general seating area. Touching the VIEW block initiates a search through the views stored in CD ROM to retrieve the appropriate picture corresponding to the selected seating area in the appropriate venue and display a view of the stage or field on the screen as seen from the selected seating area.

Touching the UNSELECT block cancels the last seat selection and if touched again cancels the previous seat selection, etc. Touching the EXIT block aborts the selection process and the program returns to the main category display. Touching the HELP block displays text instructing the user on use of the system. Instructions may also be given audibly by a synthesized voice through the sound system in one or more languages. Touching the PROCEED block causes the program to display an option screen having a RETURN block and a PROCEED block along with a text message giving the customer the option of either returning to the main category display for additional ticket selections or to make no additional selections and proceed with the purchase of the current selection by pressing the RETURN block or PROCEED block. Touching the RETURN block will return the program to the main category selection level and display the main categories of types of events. Touching the PROCEED block causes the program to enter the purchase level described hereinafter.

At this point the data inputted from either the general admission or reserved seating steps and stored in temporary memory is the event, date, time of performance, number of tickets, reserved seat number if applicable, price per ticket, and total purchase price.

MISCELLANEOUS MAIN CATEGORY

Figure 9:
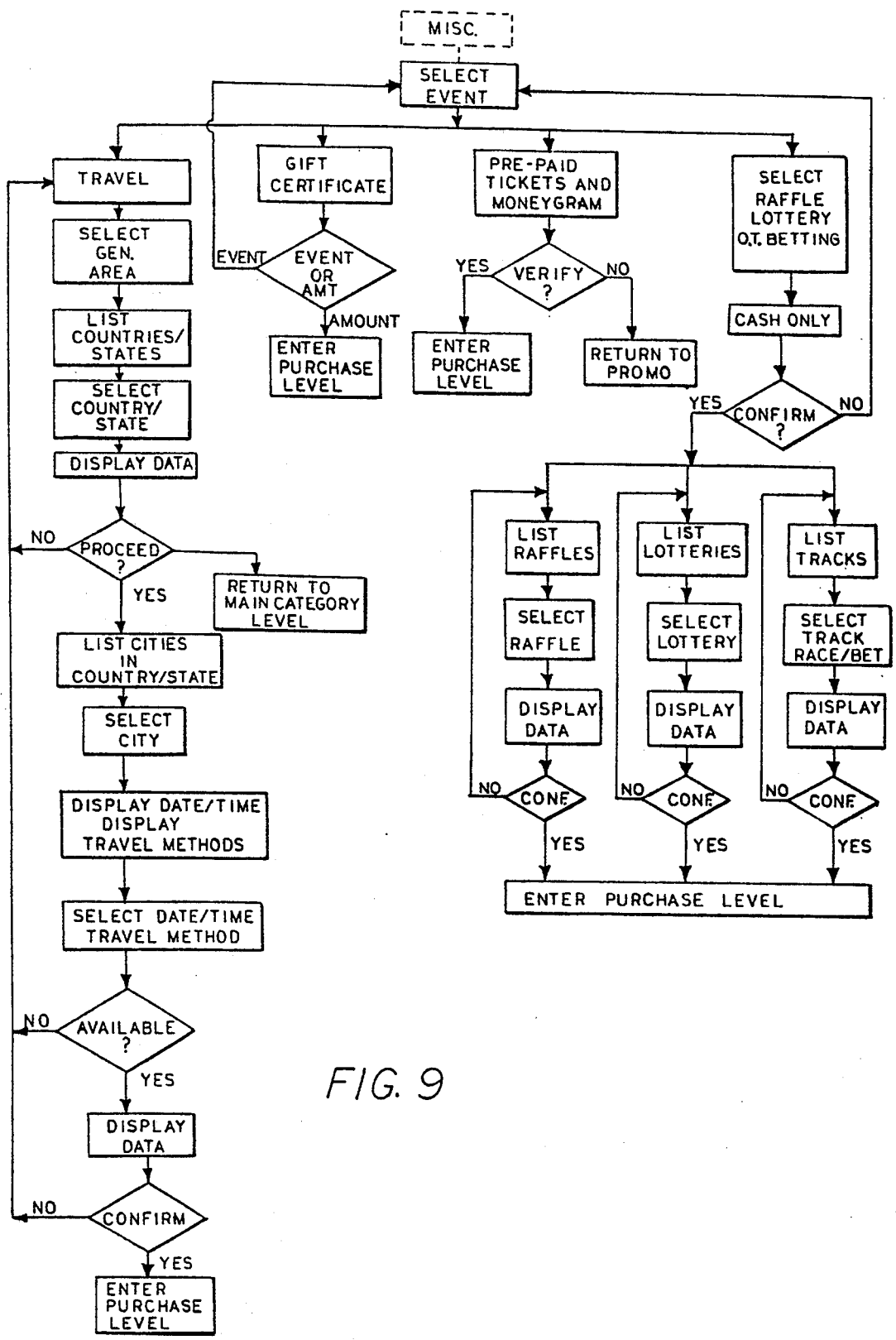
FIG. 9 is a block diagram illustrating the operation of the system during a transaction involving the miscellaneous main category selection.

Referring now to FIG. 9, the main category of MISCELLANEOUS may include such things as: MOVIE TICKETS, PREPAID TICKET PICK-UP, GIFT CERTIFICATES, MONEYGRAMS, RAFFLE TICKETS, LOTTERY TICKETS, TRAVEL TICKETS, BUS PASSES, and tickets to OUT-OF-TOWN events. These transactions are slightly different from the previously described transactions up to the point of entering the purchase level.

The MOVIE TICKET transaction would follow the same procedures outlined in the "general admission" transaction described previously wherein a list of the movies are listed on the screen in chronological order with the name, date, time of performance, theater and price of tickets and can be scrolled up and down for selection by the customer.

In the PRE-PAID TICKET PICK-UP transaction, a customer may order and prepay for tickets by telephone by calling the ticket vending service and making the purchase using a credit card and then pick up the tickets at a ticket vending console at a convenient location. When the telephone purchase is made, the customer must give his or her four digit personal identification number (P.I.N.) corresponding to their ATM card or credit card number and a four digit transaction identification number (T.I.N.) and code word is given to the purchaser. Prepaid ticket information is periodically loaded into resident hard disk memory from the central office by modem. If the PRE-PAID TICKET sub-category is selected at the console, the program proceeds to the purchase level for verification then the ticket issuance level (described hereinafter).

A customer may also purchase a gift certificate for a specific event or for credit at a participating department store at the console. If the GIFT CERTIFICATE sub-category is selected at the console, the program displays three message blocks, one labeled "specific event?", one displaying a list of participating stores with a highlighted area at the center and an up and down positioning symbol which can be scrolled up and down as described previously, and another labeled "amount?" along with a message asking the customer to make a selection. If "specific event" is selected, the program returns to the "select event" level and the customer then goes through the selection process described above up to the purchase level. The customer selects the name of the store by touching the highlighted area of the screen then touches "amount", and the program proceeds to the purchase level.

In the MONEYGRAM transaction, a customer may send money to another customer who can pick up a moneygram ticket at a convenient console and redeem it at a participating store location in the vacinity of the console. This can be done by the sender using a convenient console or visiting the ticket vending service office and purchasing the moneygram ticket using cash only. When the purchase is made, the sender is issued a four digit transaction identification number (T.I.N.) and a code word. Moneygram ticket information is periodically loaded into resident hard disk memory from the central office by modem. The sender must also inform the recipient of the T.I.N. and code word so that the recipient can pick up the moneygram ticket at a console. If the MONEYGRAM sub-category is selected at the console, the program proceeds to the purchase level for verification then the ticket issuance level (described hereinafter).

If the TRAVEL sub-category is selected, the program displays a symbol labeled INTERNATIONAL, a symbol labeled NATIONAL, and a symbol labeled STATE/REGIONAL, along with CANCEL block and a message instructing the customer to select the travel choice by touching the appropriate symbol or label. For example; the INTERNATIONAL symbol may be a globe, the NATIONAL symbol may be an image of the United States, and the STATE/REGIONAL symbol may be an image of one of the states.

When the symbol or label is touched, the program displays the selected symbol on one part of the screen and a window on another part of the screen with a list of the corresponding countries or states for which tickets are available along with a highlighted area at the center and an up and down arrow or direction symbol and a message asking the customer to enter the destination country or state. Also displayed on the screen are a SELECT block, a CANCEL block, a HELP block, and a PROCEED block. The list of countries or states can be scrolled up and down by the user touching the arrow symbols. The country or state is selected by the user placing the desired country or state in the highlighted area and then touching the SELECT block. Touching the CANCEL block aborts the selection process and the program returns to the main category display.

Touching the PROCEED block causes the program to display a list of cities within the selected country or state in the window along with a message asking the customer to select the city by touching the SELECT block. After the city is selected, the program displays a DEPARTURE and RETURN screen with a TIME window, a DATE window, a MONTH window, and UP and DOWN arrows for changing the time, date, and month. Also displayed is a series of transportation symbols, such as an airplane, train, bus, ship, etc. A message is displayed instructing the customer to select the desired departure and return time, date, and month and method of travel by touching the appropriate UP and DOWN arrow symbols and the symbol for the method of travel and the the PROCEED block.

When the PROCEED block is touched, the program checks resident hard disk storage and/or dials the appropriate remote ticket center via modem to retrieve a list of available travel schedules and prices corresponding to the inputted information. The inputted data is then displayed with "YES" and "NO" block and a message asking the customer to confirm. A "NO" response on the screen will return the program to the "TRAVEL" sub-category level. A "YES" response will take the program to the ticket purchase level.

A person must first be qualified before using the LOTTERY or OFF-TRACK BETTING sub-category by registering with the ticket service main office and showing proof of age, after which a four digit "Wager Identification Number" (W.I.N.) is issued to the customer. The W.I.N. identification numbers are periodically loaded into resident hard disk memory from the central office by modem.

When the LOTTERY or OFF-TRACK BETTING sub-category is selected, a "YES" and "NO"-block along with a keypad image and a message is displayed informing the customer that sub-categories of lottery and off-track betting are cash only transactions. The customer is requested to confirm that this is a cash only transaction and to enter the W.I.N. number on the keypad image. A "NO" response will return the program to the event selection menu. A "YES" response and entry of the W.I.N number will cause the program check resident hard disk storage to verify the W.I.N. number and, if verified, to retrieve and display a list of respective available lotteries with a message asking the customer to select the lottery by using the arrow keys to place the event in the highlighted area and touch the SELECT block.

If a lottery is selected, the program displays a window showing the total number of tickets to be purchased for the selected lottery. A pair of blocks are displayed below the window; one for increasing the number of tickets to be purchased, and the other for decreasing the number of tickets to be purchased. Also displayed are a series of blocks; one labeled RANDOM SELECT, one labeled MANUAL SELECT, one labeled HELP, and another labeled CANCEL. Touching the CANCEL block aborts the selection process and the program returns to the main category display. Touching the HELP block displays text instructing the user on use of the system. Instructions may also be given audibly by a synthesized voice through the sound system.

If the RANDOM SELECT block is touched, the program displays a screen having a series of double digit windows and the system will generate a series of random double digit numbers which are displayed in the windows. A PROCEED block, a HELP block, and a CANCEL block are displayed below the double digit windows. Touching the CANCEL block aborts the selection process and the program returns to the main category display. Touching the HELP block displays text instructing the user on use of the system. Instructions may also be given audibly by a synthesized voice through the sound system. Touching the PROCEED block will take the program to the ticket purchase level.

If the MANUAL SELECT block is touched, the program displays a screen having a series of double digit windows and a series of blocks below the double digit windows; one for increasing or decreasing the left-hand digit, and another for increasing or decreasing the right-hand digit. Thus, the customer may manually select the double digit numbers which are displayed in the windows. A PROCEED block, a HELP block, and a CANCEL block are displayed below the double digit windows. Touching the CANCEL block aborts the selection process and the program returns to the main category display. Touching the HELP block displays text instructing the user on use of the system. Instructions may also be given audibly by a synthesized voice through the sound system. Touching the PROCEED block will take the program to the ticket purchase level.

When the OFF-TRACK BETTING sub-category is selected, the customer is requested to confirm that this is a cash only transaction and to enter the W.I.N. number on the keypad image. A "NO" response will return the program to the event selection menu. A "YES" response and entry of the W.I.N number will cause the program check resident hard disk storage to verify the W.I.N. number and, if verified, to retrieve and display a list of respective available racing tracks with a message asking the customer to select the track by using the arrow keys to place the desired track the highlighted area and touch the SELECT block. A window labeled race number is also displayed along with a pair of blocks below the window for increasing or decreasing the race number. Thus, the customer may manually select the track and the race which are displayed in the windows. A PROCEED block, a HELP block, and a CANCEL block are displayed below the windows. Touching the CANCEL block aborts the selection process and the program returns to the main category display. Touching the HELP block displays text instructing the user on use of the system. Instructions may also be given audibly by a synthesized voice through the sound system.

Touching the PROCEED block will bring up a screen having a window listing the horses in the selected race with their statistics, a keypad image, and a series of windows for the type of bet, for example "win", "place", "show", "quinella", "exacta" etc. Also displayed are a PROCEED block, a HELP block, and a CANCEL block along with a message instructing the customer to enter the amount of the bet, the type of bet, and the number of the horses, and then touch the PROCEED block. Touching the CANCEL block aborts the selection process and the program returns to the main category display. Touching the HELP block displays text instructing the user on use of the system. Instructions may also be given audibly by a synthesized voice through the sound system. Touching the PROCEED block will bring up a varification screen which displays the inputted data along with a "YES" and "NO" block and a message asking the customer to confirm. A "NO" response will return the program to the appropriate list of raffles, lotteries, or tracks. A "YES" response will take the program to the purchase level.

PURCHASE LEVEL

Figure 10:
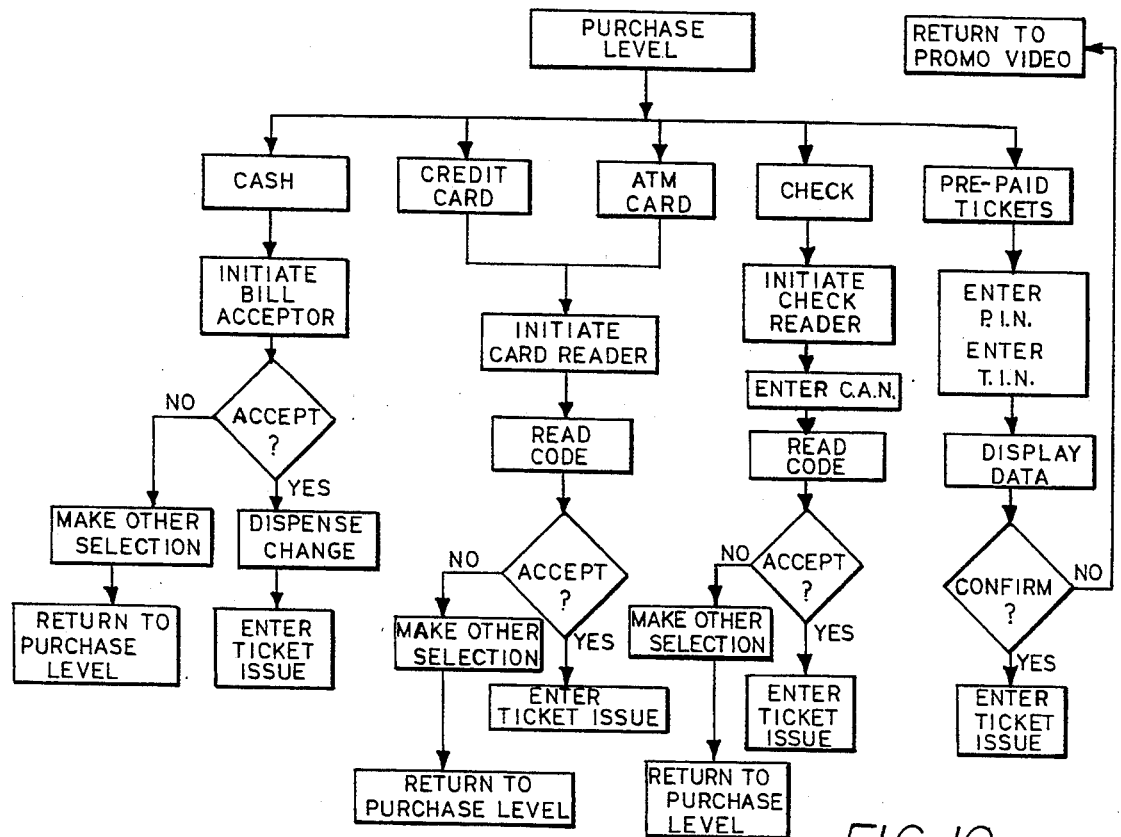
FIG. 10 is a block diagram illustrating the operation of the system when the program enters the purchase level.

As seen in FIG. 10, when the program enters the purchase level, the program displays the total amount of the purchase and a payment category menu on the touch sensitive screen which lists the types of payment instruments accepted by the machine and a message asking the customer to select which type of payment. For example; cash, credit card, bank debit (ATM) card, local personal check, or pre-paid. The customer then chooses the desired type of payment and touches the screen at the line of his or her selection. This signal is inputted to the microprocessor and the program retrieves from hard disk memory a program to operate the appropriate peripheral device to accept payment.

If the PRE-PAID TICKET or MONEYGRAM sub-category of the MISCELLANEOUS main event category is selected at the console, the program displays a message along with the image of a numerical keypad and "enter" block asking the customer to first enter the credit card personal identification number (P.I.N) and touch "enter" then to enter the transaction identification number (T.I.N.) and code word, then touch "enter". The transaction is displayed with a "YES" and "NO" block and a message asking the customer to confirm. A "NO" response ends the transaction and returns the program to the promotional video. A "YES" response will take the program to the ticket issuance level. MONEYGRAM purchase is a cash only transaction.

If the customer selects "cash" as the payment method, this signal is inputted to the microprocessor and the program will initiate operation of the bill acceptor device and a message is displayed asking the customer to insert the bills into the bill acceptor slot on the console. As the bills enter the bill reader, they are checked to determine if they are counterfeit. If they are, they are returned to the customer and a message is displayed asking for a different method of payment. If the amount inserted is greater than the purchase price, the change is dispensed, and the program proceeds to the ticket issuance level. Preferably, $1 bills are separated from the other denominations and routed to a separate drop slot.

If the customer selects "credit card" or "bank debit" (ATM) card, this signal is inputted to the microprocessor and the program will initiate operation of corresponding credit card reader to read the magnetic code on the card. The program then displays a message asking the customer to insert the card into the credit card slot on the face of the console.

If the customer has established an account with the ticket vending service for writing personal checks, the customer would touch the "check" block and the screen would display the image of a keypad and an "enter" block with a message asking the customer to enter his or her check approval number (C.A.N.), and then to enter the four digit P.I.N. number at the bottom of the check. This signal is inputted to the microprocessor and the program will initiate operation of the check reader to read the magnetic code on the check. The program then displays a message asking the customer to make out the check and insert it into the currency slot on the face of the console.

The appropriate reader device then decodes the information and cross references the inputted data against a bad credit list or approved customer list stored in credit memory. The credit memory has stored information pertaining to bad credit for particular credit card numbers or customers having approved credit and is updated periodically via modem from a remote credit service data bank via modem. In the event of a desired transaction going over a predetermined dollar limit for credit cards, the microprocessor will dial out to a credit data bank via modem for approval. Optionally, the program may be written so that after reading the magnetic code, the microprocessor will dial out to obtain credit approval from the appropriate remote credit data bank via modem. After obtaining credit approval from resident or remote memory, the program then proceeds the ticket issuance level to print out the tickets.

TICKET ISSUANCE

Figure 11:
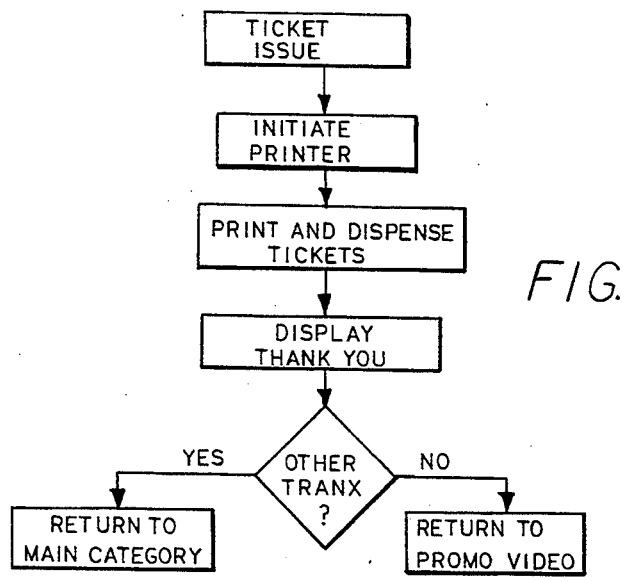
FIG. 11 is a block diagram illustrating the operation of the system when the program enters the ticket issuance level.

Referring now to FIG. 11, when the program enters the ticket issuance level, the program will initiate operation of the ticket printer device. The ticket stock is stored in a steel box in the console and the individual tickets are printed out after the purchase has been approved. The tickets, as previously described with reference to FIGS. 4 and 5, may have a unique color combination, raised printing for the company logo, and a series of holes at the top for the tractor feed wheel of the printer. The ticket stock may also have a portion at the bottom which will have different shapes punched out by an additional printer drive wheel that is changed on a regular basis and may be provided with a strip of holographic film to discourage counterfeiting.

As the tickets are printed, they are fed through the previously described ticket feed chute (FIG. 7) and an printer wheel which punches out shapes in the ticket stock. The ticket stock passes through the chute as it comes out of the steel box in which it is stored and is fed to the printer. After printing, the tickets are fed to the ticket dispensing slot on the console where they are retained until removed by the customer.

After the tickets are dispensed, the program displays a message thanking the customer for the transaction and asking if there are any other transactions to be done along with a "YES" and "NO" block If the response is "YES" the program returns to the main category menu If the response is "NO" the program strikes the purchased tickets from data storage and periodically calls a remote central ticket center via modem to report that the tickets have been sold for purposes of re-allocating ticket availability. After a few seconds, the program resumes running the promotional program on the VHS video cassette playback unit to display upcoming events and attractions in the area and advertising for local clubs and restaurants in the form of action video and/or graphics. The promotional tape will replay automatically until another customer touches the touch sensitive screen of the video display monitor.

While this invention has been described fully and completely with special emphasis upon a preferred embodiment, it should be understood that within the scope of the appended claims the invention may be practiced otherwise than as specifically described herein.

I claim:

1. An automatic ticket sales and dispensing system for use by customers to select and purchase tickets for events and other activities comprising;

a ticket sales and vending console connected to a source of electrical current and including a microprocessor control system operated in part by the input of the customer in response to displayed messages;

said console having a video display monitor with a touch sensitive screen coupled with said microprocessor control system adapted to display messages and supply data input signals relative to the displayed messages in response to the customer touching designated areas of the screen, a video cassette player operatively connected with said microprocessor control system and said video display screen for displaying recorded video images, an audio system including loudspeakers operatively connected with said microprocessor control system and said video cassette player, currency handling means in said terminal controlled by said microprocessor control system for accepting and verifying currency and dispensing change, and ticket printing and vending means controlled by said microprocessor control system for printing tickets;

first memory means connected with said microprocessor having stored programs for controlling the operation of said video display monitor and touch sensitive screen, said video cassette player, said audio system, said currency handling means, and said ticket printing and vending means;

second memory means connected with said microprocessor for storing inputted data in the course of computation and controlling the operation of said microprocessor;

event data memory means operatively connected with said microprocessor having stored data representing events for which tickets may be purchased, said event data being classified and retrievable according to main category of event types, subcategories of each main category event type, type of seating, name, date, time of performance, price of tickets for specific events, and number of tickets available to be purchased;

a modem operatively connected to said console microprocessor and to a central data bank for periodically sending and receiving data and updating data stored in said event data memory means;

an event selection program stored in said first memory means that displays on said video display monitor a series of titles of the main categories of event types for which tickets may be purchased and a message instructing the customer to select the desired type of event by touching said touch sensitive screen at the appropriate main category title;

image memory means operatively connected with said microprocessor having stored image data representing the seating area maps of various venues and seating view memory means operatively connected with said microprocessor and said image memory means, said seating view memory means having stored views of the stage or field as seen from various seating areas in the venues;

at least one payment insertion slot on said console for accepting currency and other payment instruments and a currency drop slot on said console for dispensing currency change;

a ticket purchase program stored in said first memory means which controls the operation of said currency handling means to accept and verify currency and to calculate and dispense change; and a ticket issuance program stored in said first memory means which controls the operation of said ticket printing and vending means; wherein upon the customer touching said touch sensitive screen at the desired type of event, a signal is generated to cause said microprocessor control system to retrieve from said event data memory means a list of all the sub-categories for the selected main category of event type and display a series of titles of the sub-categories for which tickets may be purchased and a message instructing the customer to select the desired sub-category of event by touching said touch sensitive screen at the appropriate sub-category title;

upon the customer touching said touch sensitive screen at the desired sub-category title, a signal is generated to cause said microprocessor control system to retrieve from said event data memory means a list of all the specific events for the selected sub-category and display them in chronological order with the name, date, time of performance, type of seating, and price of tickets along with a highlighted area on the monitor, a symbol for scrolling the list, a selection symbol for entering a selection, and a message instructing the customer to select the desired specific event by positioning it in the highlighted area and then touching said selection symbol;

upon the customer selecting a specific event having the desired type of seating, a signal is generated to cause said microprocessor control system to retreive from said image memory means and display an image of a map of the seating areas in the venue where the event is to take place along with a message instructing the customer to select the desired general seating area by touching the screen at the appropriate seating area;

upon the customer touching said touch sensitive screen at the desired seating area of the displayed map, a signal is generated to cause said microprocessor control system to display an image of the selected seating area with only the seats for which tickets are available shown and a message instructing the customer to select the exact seats desired in that area;

upon the customer touching said touch sensitive screen at the desired seating area of the displayed map, a signal is generated to cause said microprocessor control system to display an image of the selected seating area with only the seats for which tickets are available shown along with an "unselect" symbol, a "proceed" symbol, an "exit" symbol, a "seating view" symbol, and a message instructing the customer to select the exact seats desired in that area by touching each desired seat;

upon the customer touching said touch sensitive screen at each desired seat, a signal is generated to cause said microprocessor control system to highlight the selected seat;

upon the customer touching said touch sensitive screen at the "seating view" symbol, a signal is generated to cause said microprocessor control system to retreive from said seating view memory means and display an image of the field or stage as seen from the selected seating area as though the customer were actually sitting in the selected seating area;

upon the customer touching said touch sensitive screen at the "unselect" symbol, a signal is generated to cause said microprocessor control system to cancel the current seat selection and upon touching it again to cancel the previous seat selection;

upon the customer touching said touch sensitive screen at the "exit" symbol, a signal is generated to cause said microprocessor control system to cancel the transaction and return to the main event category level;

upon the customer touching said touch sensitive screen at the "proceed" symbol, a signal is generated causing said microprocessor control system to display a "return" symbol and a "proceed" symbol along with a message asking the customer to touch the "return" symbol if it is desired to return to the main event category selection menu to select another event or to touch the "proceed" symbol if it is desired to proceed with the purchase of the current selections;

upon the customer touching said touch sensitive screen at the "return" symbol, a signal is generated causing said microprocessor control system to return to the main event category level; and upon the customer touching said touch sensitive screen at the "proceed" symbol, a signal is generated causing said microprocessor control system to initiate said ticket purchase program.

2. An automatic ticket sales and dispensing system according to claim 1 including;

a promotional display program run by said video cassette player to continuously display upcoming events and attractions in an area and advertising for local clubs and restaurants in the form of action video and graphics during times when no transactions are being made and displaying a symbolic start image and a message instructing the customer to touch the start image to begin the transaction;

upon the customer touching said touch sensitive screen at the area of the displayed start image, a signal is generated to cause said microprocessor control system to initiate said event selection program.

3. An automatic ticket sales and dispensing system according to claim 1 in which;

said ticket purchase program calculates and displays the total amount of the purchase corresponding to the selections entered by the customer and displays and a payment category menu which represents the types of payment instruments accepted by the system and a message instructing the customer to select the desired type of payment instrument by touching said touch sensitive screen at the appropriate area on the payment category menu; and upon the customer touching said touch sensitive screen at the appropriate area representing the desired type of payment, a signal is generated to cause said microprocessor control system to operate said currency handling means to accept payment.

4. An automatic ticket sales and dispensing system according to claim 3 in which;

said currency handling means includes a currency acceptor mechanism with a change maker mechanism connected with said at least one payment insertion slot for verifying and receiving currency bills and providing an output signal upon acceptance or rejection, counter means for registering the amount of currency and calculating the difference, a storage box for storing the accepted currency, and a storage box for storing change to be dispensed;

said payment category menu includes a "cash" category; and upon the customer touching said touch sensitive screen at the area of the menu representing "cash", a signal is generated causing the microprocessor system to initiate operation of said currency handling mechanism and to display a message instructing the customer to insert currency bills into the bill payment insertion slot on the console;

upon an output signal of said currency acceptor mechanism indicating rejection of the inserted currency bill, said currency acceptor mechanism returning the rejected currency bill and said output signal causing said microprocessor control system to display a message instructing the customer to select another method of payment and thereafter returning to the initial said promotional display program, and upon an output signal of said currency acceptor mechanism indicating acceptance of the inserted currency bill, and the amount inserted is greater than the calculated purchase price, said currency acceptor mechanism dispensing the correct amount of change, and said output signal causing said microprocessor control system to initiate said ticket issuance program.

5. An automatic ticket sales and dispensing system according to claim 3 including;
- credit data memory means operatively connected with said microprocessor having stored data representing the credit worthiness of customers corresponding to identification numbers on credit cards and similar cards having a magnetic code thereon; and
- said currency handling means including a credit card acceptor mechanism with a magnetic code reader mechanism connected with said at least one payment insertion slot for receiving and reading cards of the type having a magnetic code and providing an output signal upon acceptance or rejection;
- said payment category menu includes a "credit card" category for transactions using credit cards and similar cards having a magnetic code thereon; and
- upon the customer touching said touch sensitive screen at the area of the menu representing "credit card" a signal is generated causing said microprocessor system to initiate operation of said credit card acceptor mechanism and to display a message instructing the customer to insert the appropriate credit card into the said payment insertion slot on said console;
- said magnetic code reader reading the code of said inserted card and recording it in said second memory means and generating a signal causing said microprocessor system to search said credit data storage means and compare the read code with the stored data and generate a rejection signal or an acceptance signal relative thereto;
- upon a rejection signal being generated, said credit card acceptor mechanism returning the rejected card and said rejection signal causing said microprocessor control system to display a message instructing the customer to select another method of payment and thereafter returning to the initial said promotional display program; and
- upon an acceptance signal being generated, said credit card acceptor mechanism returning the inserted card and the amount of the calculated purchase price being recorded in memory correlated to the customer's magnetic code number as a transaction and following the recording of the transaction, said microprocessor control system initiating said ticket issuance program.

6. An automatic ticket sales and dispensing system according to claim 3 including;
- credit data memory means operatively connected with said microprocessor having stored data representing the credit worthiness of customers who have pre-approved credit and have been issued a check approval number and are using an approved credit card number as security for the transaction;
- said currency handling means includes a check acceptor mechanism with a magnetic code reader mechanism connected with said at least one payment insertion slot for receiving and reading the magnetic code on checks and providing an output signal upon acceptance or rejection;
- said payment category menu includes a "check" category for transactions using checks having a magnetic code thereon; and
- upon the customer touching said touch sensitive screen at the area of the menu representing "check", a signal is generated causing said microprocessor system to initiate operation of said check acceptor mechanism and to display an image of a numerical keypad and a message instructing the customer to enter the check approval number and then the magnetic code number at the bottom of the check by touching the number keys on the displayed keypad image;
- upon the entry of the inputted numbers, said microprocessor control system recording them in said second memory means and searching said credit data memory means and comparing the inputted numbers with the stored data and generating a rejection signal or an acceptance signal relative thereto;
- a rejection signal causing said microprocessor control system to display a message instructing the customer to select another method of payment and therafter returning to the initial said promotional display program; and
- an acceptance signal causing said microprocessor control system to display the total amount of the purchase and and a message instructing the customer to fill in the check for the total amount of the purchase displayed, and to insert the check into the said payment insertion slot on the console; and
- upon receipt of the check, the amount of the calculated purchase price being recorded in memory correlated to the customer's magnetic code number as a transaction and following the recording of the transaction, said microprocessor control system initiating said ticket issuance program.

7. An automatic ticket sales and dispensing system according to claim 1 including;
- credit data memory means operatively connected with said microprocessor having stored data representing customers who have pre-paid for tickets using an approved credit card number or personal identification number and have been issued a transaction identification number and a code word;
- one of said titles of main category of events displayed by said event selection program is representative of a "miscellaneous" category; and
- upon the customer touching said touch sensitive screen at the title representative of the "miscellaneous" category one of the series of titles of the sub-categories received and displayed is a title representing "pre-paid tickets" which may be picked up at said console; and
- upon the customer touching said touch sensitive screen at the title representing "pre-paid tickets", a signal is generated to cause said microprocessor control system to display an image of a numerical keypad and a message instructing the customer to enter the issued personal identification number and then the issued transaction number and code word by touching the number keys on the displayed keypad image;
- upon the entry of the inputted numbers said microprocessor control system recording them in said second memory means and searching said credit data memory means and comparing the inputted numbers with the stored data and displaying the selected event, date, time of performance, number of tickets, price per ticket, and total purchase price with a "YES" and "NO" confirmation image and a message asking the customer to confirm the information by touching the appropriate confirmation image;

upon the customer touching said touch sensitive screen at the "NO" confirmation image, a signal is generated to cause said microprocessor control system to return to said promotional display program; and upon the customer touching said touch sensitive screen at the "YES" confirmation image, a signal is generated to cause said microprocessor control system to initiate said ticket issuance program.

8. An automatic ticket sales and dispensing system according to claim 1 including;

credit data memory means operatively connected with said microprocessor having stored data representing sending customers who have pre-paid for tickets redeemable for cash using a cash only purchase and have been issued a transaction identification number and code word and desire that the ticket be picked up by a receiving customer;

one of said titles of main category of events displayed by said event selection program is representative of a "miscellaneous" category; and upon the receiving customer touching said touch sensitive screen at the title representative of the "miscellaneous" category one of the series of titles of the sub-categories received and displayed is a title representing "moneygram tickets" which may be picked up at said console; and upon the receiving customer touching said touch sensitive screen at the title representing "moneygram tickets", a signal is generated to cause said microprocessor control system to display an image of a numerical keypad and a message instructing the customer to enter the issued transaction number and code word by touching the keys on the displayed keypad image;

upon the entry of the inputted numbers said microprocessor control system recording them in said second memory means and searching said credit data memory means and comparing the inputted numbers with the stored data;

upon entry of an incorrect transaction identification number or code word, a signal is generated to cause said microprocessor control system to return to said promotional display program; and upon entry of the correct transaction identification number and code word, a signal is generated to cause said microprocessor control system to initiate said ticket issuance program.

9. An automatic ticket sales and dispensing system according to claim 1 including;

gift data memory means operatively connected with said microprocessor having stored data representing events, participating retail stores, and dollar amounts for which gift certificate tickets may be purchased;

one of said titles of main category of events displayed by said event selection program is representative of a "miscellaneous" category; and upon the customer touching said touch sensitive screen at the title representative of the "miscellaneous" category one of the series of titles of the sub-categories retrieved and displayed is a title representing "gift certificates" which may be picked up at said console; and upon the customer touching said touch sensitive screen at the title representing "gift certificates", a signal is generated to cause said microprocessor control system to display a menu displaying the names of events, participating retail stores, and dollar amounts for which tickets may be purchased, and a message instructing the customer to select an event or retail store and dollar amount by touching the appropriate area on the displayed menu;

upon the customer touching said touch sensitive screen at the area of the menu representing events a signal is generated causing said microprocessor system to return to said event selection program; and upon the customer touching said touch sensitive screen at the area representing retail stores and dollar amounts, a signal is generated causing said microprocessor system to initiate said ticket purchase program.

10. An automatic ticket sales and dispensing system according to claim 1 including;

travel data memory means operatively connected with said microprocessor having stored data representing countries, states, cities, methods of transportation available and the corresponding travel routes, travel schedule, and ticket prices, for which tickets may be purchased;

one of said titles of main category of events displayed by said event selection program is representative of a "miscellaneous" category; and upon the customer touching said touch sensitive screen at the title representative of the "miscellaneous" category one of the series of titles of the sub-categories retrieved and displayed is a title representing "travel" tickets which may be picked up at said console;

upon the customer touching said touch sensitive screen at the title representing "travel", a signal is generated to cause said microprocessor control system to display symbols representing international, national, and state/regional areas for which tickets may be purchased and a message instructing the customer to select the desired international, national, and state/regional area by touching said touch sensitive screen at the appropriate symbol;

upon the customer touching said touch sensitive screen at symbol representing the desired area of travel, a signal is generated to cause said microprocessor control system to display the previously selected area symbol and retrieve from said travel data memory means and display a list of the countries or states the selected area for which tickets are available along with a highlighted area on the monitor, a symbol for scrolling the list, a "selection" symbol, a "proceed" symbol, and a message instructing the customer to enter the desired country or state by positioning the name in the highlighted area and then touching said touch sensitive screen at the "selection" symbol and then the "proceed" symbol;

upon the customer touching said touch sensitive screen at the "proceed" block, a signal is generated to cause said microprocessor control system to retrieve from said travel data memory means and display a list of names of cities within the selected country or state for which travel tickets are available along with a "selection" symbol, a highlighted area on the monitor, a symbol for scrolling the list, and a message instructing the customer to select the desired destination city by positioning the name in the highlighted area and then touching said touch sensitive screen at the "selection" symbol;

upon the customer touching said touch sensitive screen at the "selection" symbol to select the desired city, a signal is generated to cause said microprocessor control system to display a series of "transportation" symbols representing various methods of travel, windows representing the desired departure and return time, date, and month, "control" symbols for changing the time, date, and month, a "proceed" symbol, and a message instructing the customer to select the desired departure and return time, date, and month and method of travel by touching said touch sensitive screen at the appropriate "transportation" and "control" symbols and then the "proceed" symbol;

upon the customer touching said touch sensitive screen at the "proceed" symbol, a signal is generated to cause said microprocessor control system to retrieve from said travel data memory means and display a list of travel routes, travel schedules, and ticket prices corresponding to the selected method of travel and departure and return time, date, and month along with a highlighted area on the monitor, a symbol for scrolling the list, a "selection" symbol, and a message instructing the customer to select the desired travel route, schedule, and ticket price by positioning the same in the highlighted area and then touching said touch sensitive screen at the "selection" symbol;

upon the customer touching said touch sensitive screen at the "selection" symbol to select the desired travel route, schedule, and ticket price, a signal is generated to cause said microprocessor control system to display the selected country or state, city, method of travel, travel route, schedule, and ticket price, along with a "YES" and "NO" confirmation symbol and a message asking the customer to confirm the information by touching the appropriate confirmation symbol;

upon the customer touching said touch sensitive screen at the "NO" confirmation symbol, a signal is generated to cause the program to return to the "travel" sub-category level; and upon the customer touching said touch sensitive screen at the "YES" confirmation symbol, a signal is generated to cause said microprocessor control system to initiate said ticket purchase program.

11. An automatic ticket sales and dispensing system according to claim 1 including;

chance data memory means operatively connected with said microprocessor having stored data representing chance events, such as raffles, lotteries, and off-track betting, along with the appropriate corresponding ticket prices and types of wagers and amounts for which tickets may be purchased;

said chance data memory means having stored data representing customers who have been pre-approved for wagering and have been issued a wager identification number;

one of said titles of main category of events displayed by said event selection program is representative of a "miscellaneous" category; and upon the customer touching said touch sensitive screen at the title representative of the "miscellaneous" category one of the series of titles of the sub-categories retrieved and displayed is a title representing "chance events" which may be picked up at said console; and upon the customer touching said touch sensitive screen at the desired title of the chance event, a signal is generated to cause said microprocessor control system to display an image of a numerical keypad and a message informing the customer that all chance events are cash only transactions along with a "YES" and "NO" confirmation symbol and a message asking the customer to confirm that the transaction will be a cash only transaction by touching the appropriate confirmation symbol and then enter the assigned wager identification number by touching the number keys on the displayed keypad image;

upon the customer touching said touch sensitive screen at the "NO" confirmation symbol, a signal is generated to cause said microprocessor control system to return to said promotional display program; and upon the customer touching said touch sensitive screen at the "YES" confirmation symbol and entering the assigned wager identification number, a signal is generated to cause said microprocessor control system to retrieve from said chance data memory means to verify the wager identification number and, if verified, to display a list of names of chance events for which tickets may be purchased along with a highlighted area on the monitor, a symbol for scrolling the list, a "selection" symbol, and a message instructing the customer to select the desired chance event by positioning the name in the highlighted area and then touching said touch sensitive screen at the "selection" symbol; and upon the customer touching said touch sensitive screen at the "selection" symbol, a signal is generated to cause said microprocessor control system to search said chance data memory means and determine if the selected chance event is a fixed ticket price or a variable price wager event.

12. An automatic ticket sales and dispensing system according to claim 11 wherein;

if the selected event has a fixed ticket price the microprocessor control system displays the number of tickets available for the selected event along with a window for showing the number of tickets to be purchased, symbols for increasing or decreasing the number of tickets to be purchased, a "proceed" symbol for proceeding after the number of tickets to be purchased have been selected, and a message instructing the customer to enter the number of tickets desired by touching the appropriate increasing or decreasing symbol and then touching the "proceed" symbol;

upon the customer touching said touch sensitive screen at the "proceed" symbol, a signal is generated to cause said microprocessor control system to display the selected event, number of tickets, price per ticket, and total purchase price along with a "proceed" symbol and a message instructing the customer to confirm the information by touching the "proceed" symbol; and upon the customer touching said touch sensitive screen at the "proceed" symbol, a signal is generated to cause said microprocessor control system to initiate said ticket purchase program.

13. An automatic ticket sales and dispensing system according to claim 11 wherein;

if the selected event is a lottery-type event the microprocessor control system displays a window for showing the number of tickets to be purchased, symbols for increasing or decreasing the number of tickets to be purchased, a "proceed" symbol for proceeding after the number of tickets to be purchased have been selected, and a message instructing the customer to enter the number of tickets desired by touching the appropriate increasing or decreasing symbol and then touching the "proceed" symbol;

upon the customer touching said touch sensitive screen at the "proceed" symbol, a signal is generated to cause said microprocessor control system to display windows for entering a series of numbers to be bet on, symbols for generating the digits of the numbers to be bet on, a "proceed" symbol, and a message instructing the customer to generate and select the numbers to be bet on by touching the appropriate number generating symbol and then touching the "proceed." symbol;

upon the customer entering the desired numbers to be bet on and touching said touch sensitive screen at the "proceed" symbol, a signal is generated to cause said microprocessor control system to display the selected event, number of tickets, price per ticket, numbers to be bet on, and total purchase price along with a "proceed" symbol and a message instructing the customer to confirm the information by touching the "proceed" symbol; and upon the customer touching said touch sensitive screen at the "proceed" symbol, a signal is generated to cause said microprocessor control system to initiate said ticket purchase program.

14. An automatic ticket sales and dispensing system according to claim 11 wherein;

if the selected event is a racing-type event the microprocessor control system displays a list of the types of race tracks available along with a highlighted area on the monitor, a symbol for scrolling the list, a "selection" symbol, and a message instructing the customer to select the desired race track by positioning the name in the highlighted area and then touching said touch sensitive screen at the "selection" symbol;

upon the customer touching said touch sensitive screen at the "selection" symbol, a signal is generated to cause said microprocessor control system to display a window for showing the number of the race to be bet on, symbols for increasing or decreasing the number of the race to be bet on, a "proceed" symbol for proceeding after the race number has been selected, and a message instructing the customer to enter the number of the race to be bet on by touching the appropriate increasing or decreasing symbol and then touching the "proceed" symbol;

upon the customer touching said touch sensitive screen at the "proceed" symbol, a signal is generated to cause said microprocessor control system to retrieve from said chance event memory means and display a list of names of the race participants, a highlighted area on the monitor, a symbol for scrolling the list of race participants, a window for entering the amount of the bet, symbols for increasing or decreasing the amount of the bet, a series of symbols representing the type of bet, a "proceed" symbol, and a message instructing the customer to select the amount of the bet, the type of bet, and the race participants to be bet on by touching said touch sensitive screen at the appropriate symbols and then touch the "proceed" symbol;

upon the customer entering the desired amount of the bet, the type of bet, and the race participants to be bet on, and touching said touch sensitive screen at the "proceed" symbol, a signal is generated to cause said microprocessor control system to display the selected race track, race number, amount of the bet, type of bet, and the race participants to be bet on, and total purchase price along with a "proceed" symbol and a message instructing the customer to confirm the information by touching the "proceed" symbol; and upon the customer touching said touch sensitive screen at the "proceed" symbol, a signal is generated to cause said microprocessor control system to initiate said ticket purchase program.

15. An automatic ticket sales and dispensing system according to claim 1 in which;

said console has a ticket vending slot on its exterior and an interior storage box containing ticket stock, said ticket printing and vending means comprises a printer having a tractor feed mechanism for feeding said ticket stock through the printer and out of the console through a ticket dispensing slot; and a replaceable wheel adapted to punch out shapes along said ticket stock as it is fed through the printer and which may be changed out from time-to-time to prevent counterfeiting of the tickets.

16. An automatic ticket sales and dispensing system for use by customers to select and purchase tickets for events and other activities which provides the customer with a view of the stage or field as it would be seen from the seating area in which the selected seats are located, comprising;

a microprocessor control system operated in part by the input of the customer in response to displayed messages;

a video display monitor with a touch sensitive screen coupled with said microprocessor control system for displaying messages and supplying data input signals relative to the displayed messages in response to the customer touching designated areas of the screen;

event data memory means connected with said microprocessor having stored data representing events for which tickets may be purchased;

an event selection program for displaying on said video display monitor a series of events for which tickets may be purchased and means for allowing the customer to select the desired event;

image memory means connected with said microprocessor having stored image data representing the seating area maps of various venues;

a seat selection program for displaying a map of the seating areas in the venue where the events are to take place and allowing the customer to select the desired seating area;

seating view memory means operatively connected with said microprocessor and with said image memory means having views of the stage or field as seen from various seating areas in the venues;

the map of the selected seating area in the venue of the selected event being displayed with the seats for which tickets are available highlighted along with a "seating view" symbol, and upon the customer touching said touch sensitive screen at the "seating view" symbol, a signal is generated to cause said microprocessor control system to retreive from said seating view memory means and display an image of the field or stage as seen from the selected seating area as though the customer were actually sitting in the selected seating area.

17. In an automatic ticket sales and dispensing system for use by customers to select and purchase tickets for events and other activities of the type having a microprocessor control system operated in part by the input of the customer in response to displayed messages, a video display monitor with a touch sensitive screen coupled with said microprocessor control system for displaying messages and supplying data input signals relative to the displayed messages in response to the customer touching designated areas of the screen, event data memory means connected with said microprocessor having stored data representing events for which tickets may be purchased, an event selection program for displaying on said video display monitor a series of events for which tickets may be purchased and means for allowing the customer to select the desired event, image memory means connected with said microprocessor having stored image data representing the seating area maps of various venues, and a seat selection program for displaying a map of the seating areas in the venue where the events are to take place and allowing the customer to select the desired seating area;

seating view memory means operatively connected with said microprocessor and with said image memory means, said seating view memory means having stored views of the stage or field as seen from various seating areas in the venues;

the map of the selected seating area in the venue of the selected event being displayed with the seats for which tickets are available highlighted along with a "seating view" symbol, and upon the customer touching said touch sensitive screen at the "seating view" symbol, a signal is generated to cause said microprocessor control system to retreive from said seating view memory means and display an image of the field or stage as seen from the selected seating area as though the customer were actually sitting in the selected seating area.

* * * * *